US011343025B2

(12) United States Patent
Akoum et al.

(10) Patent No.: US 11,343,025 B2
(45) Date of Patent: *May 24, 2022

(54) CHAIN BROADCASTING IN VEHICLE-TO-EVERYTHING (V2X) COMMUNICATIONS

(71) Applicant: AT&T Intellectual Property I, L.P., Atlanta, GA (US)

(72) Inventors: Salam Akoum, Austin, TX (US); Xiaoyi Wang, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/104,486

(22) Filed: Nov. 25, 2020

(65) Prior Publication Data
US 2021/0083808 A1 Mar. 18, 2021

Related U.S. Application Data

(63) Continuation of application No. 16/372,887, filed on Apr. 2, 2019, now Pat. No. 10,892,858.
(Continued)

(51) Int. Cl.
*H04L 1/18* (2006.01)
*H04W 48/00* (2009.01)
(Continued)

(52) U.S. Cl.
CPC .......... *H04L 1/1819* (2013.01); *H04B 7/0608* (2013.01); *H04W 48/17* (2013.01); *H04W 72/0453* (2013.01)

(58) Field of Classification Search
CPC .... H04L 1/1819; H04B 7/0608; H04W 48/17; H04W 72/0453
See application file for complete search history.

(56) References Cited

U.S. PATENT DOCUMENTS 4,831,526 A 5/1989 Luchs et al.
7,123,617 B1 10/2006 Abrol
(Continued)

FOREIGN PATENT DOCUMENTS

WO 2010053347 A1 5/2010
WO 2011083389 A1 7/2011
(Continued)

OTHER PUBLICATIONS

Alshaer, et al., "An adaptive broadcast scheme for intervehicle communication," Conference Paper Jan. 2005, DOI: 10.1109/VETECS.2005.1543865—Source: IEEE Xplore, 6 pages.
(Continued)

*Primary Examiner* — Kyle Vallecillo
(74) *Attorney, Agent, or Firm* — Amin, Turocy & Watson, LLP

(57) ABSTRACT

The subject matter described herein is directed towards a technology that increases the reliability of transmitting information, and extends the coverage of a vehicle-to-everything (V2X) network by propagating received information in a multiple-stage chain communication in a wireless communication system. A transmitting device transmits a communication message with repetition data indicating number of times the communication message is to be retransmitted in the wireless communication system. A receiving device determines from the repetition data that the communication message is intended to be retransmitted, modifies (e.g., decrements) the repetition data, and retransmits the communication message in association with the modified repetition data.

20 Claims, 10 Drawing Sheets

Related U.S. Application Data

(60) Provisional application No. 62/738,419, filed on Sep. 28, 2018.

(51) Int. Cl.
  *H04W 72/04* (2009.01)
  *H04B 7/06* (2006.01)

(56) References Cited

U.S. PATENT DOCUMENTS

| | | |
|---|---|---|
| 7,653,010 B2 | 1/2010 | Ensor et al. |
| 7,880,861 B2 | 2/2011 | Pouls |
| 8,130,731 B2 | 3/2012 | Hollick et al. |
| 8,149,748 B2 | 4/2012 | Bata et al. |
| 8,274,928 B2 | 9/2012 | Dykema et al. |
| 8,401,878 B2 | 3/2013 | Stender et al. |
| 8,488,482 B2 | 7/2013 | Clave et al. |
| RE44,606 E | 11/2013 | Herz et al. |
| 8,929,228 B2 | 1/2015 | Budampati et al. |
| 8,995,454 B2 | 3/2015 | Hemli et al. |
| 9,078,292 B1 | 7/2015 | Mullen |
| 11,057,898 B2* | 7/2021 | Qian ............... H04W 72/0413 |
| 11,129,202 B2* | 9/2021 | Lee ................... H04W 72/121 |
| 2006/0023713 A1 | 2/2006 | Choi et al. |
| 2012/0327840 A1 | 12/2012 | Chen et al. |
| 2016/0047884 A1 | 2/2016 | Zhang et al. |
| 2016/0081055 A1 | 3/2016 | Chika et al. |
| 2016/0285595 A1 | 9/2016 | Chen et al. |
| 2017/0188290 A1 | 6/2017 | Hayee et al. |
| 2017/0347394 A1 | 11/2017 | Yasukawa et al. |
| 2018/0054717 A1 | 2/2018 | Navalekar et al. |
| 2018/0109993 A1 | 4/2018 | Kwan et al. |
| 2018/0197249 A1 | 7/2018 | Lehman et al. |
| 2019/0020381 A1 | 1/2019 | Tooher et al. |
| 2019/0215872 A1* | 7/2019 | Park ................. H04W 52/0216 |
| 2019/0349138 A1 | 11/2019 | Hosseini et al. |
| 2019/0363843 A1 | 11/2019 | Gordaychik |
| 2019/0372653 A1 | 12/2019 | Chae et al. |
| 2019/0387378 A1 | 12/2019 | Willis et al. |
| 2020/0059322 A1 | 2/2020 | Lei et al. |
| 2020/0145165 A1 | 5/2020 | Yang et al. |
| 2020/0236655 A1 | 7/2020 | Bharadwaj et al. |
| 2021/0058213 A1* | 2/2021 | Zhao ..................... H04L 5/0092 |
| 2021/0176786 A1* | 6/2021 | Liang ................ H04W 74/0825 |
| 2021/0227425 A1* | 7/2021 | Uchiyama ............ H04L 1/1887 |

FOREIGN PATENT DOCUMENTS

| | | |
|---|---|---|
| WO | 2014054123 A1 | 4/2014 |
| WO | 2015032436 A1 | 3/2015 |
| WO | 2016126319 A1 | 8/2016 |
| WO | 2017007104 A1 | 1/2017 |
| WO | 2017033486 A1 | 3/2017 |
| WO | 2018068817 A1 | 4/2018 |
| WO | 2018092961 A1 | 5/2018 |
| WO | 2018093381 A1 | 5/2018 |

OTHER PUBLICATIONS

Hrizi, et al., "On Congestion-Aware Broadcasting in V2X Networks," 2009 IEEE, 8 pages.

Kanrar, "Efficient Packet Forwarding in Mesh Network," Article in International Journal of Interactive Mobile Technologies (iJIM)—May 2012, 5 pages.

Mostafa, et al., "A probabilistic routing by using multi-hop retransmission forecast with packet collision-aware constraints in vehicular networks," 2013 Elsevier B.V, http://dx.doi.org/10.1016/j.adhoc.2013.11.012, 12 pages.

Suthaputchakun, et al., "Multi-Hop Broadcast Protocol in Intermittently Connected Vehicular Networks," Manuscript submitted Nov. 27, 2015, 36 pages.

Non-Final Office Action received for U.S. Appl. No. 16/372,887 dated Jun. 5, 2020, 55 pages.

Zheng, K., et al., "Heterogeneous Vehicular Networking: A Survey on Architecture, Challenges, and Solutions", IEEE Communications Surveys & Tutorials, vol. 17, Issue: 4, IEEE, Jun. 2015, pp. 2377-2396. (Year: 2015).

Non-Final Office Action received for U.S. Appl. No. 16/809,768 dated May 29, 2020, 70 pages.

Notice of Allowance received for U.S. Appl. No. 16/372,887 dated Sep. 16, 2020, 32 pages.

Final Office Action received for U.S. Appl. No. 16/809,768 dated Sep. 14, 2020, 64 pages.

* cited by examiner

CHAIN BROADCASTING IN VEHICLE-TO-EVERYTHING (V2X) COMMUNICATIONS

RELATED APPLICATIONS

This application is continuation of, and claims priority to, U.S. patent application Ser. No. 16/372,887, filed Apr. 2, 2019 (now issued as U.S. Pat. No. 10,892,858), and entitled "CHAIN BROADCASTING IN VEHICLE-TO-EVERYTHING (V2X) COMMUNICATIONS," which applications each claim further priority to U.S. Provisional Patent Application No. 62/738,419, filed on Sep. 28, 2018, entitled "CHAIN BROADCASTING IN VEHICLE-TO-EVERYTHING (V2X) COMMUNICATIONS." The entireties of the aforementioned applications are hereby incorporated herein by reference.

TECHNICAL FIELD

The subject application is related to wireless communication systems, and, for example, to vehicle-to-everything (V2X) communications, using broadcast data propagation, such as in a New Radio (NR) wireless network.

BACKGROUND

In LTE wireless communication systems, vehicle-to-everything (V2X) generally utilizes the Sidelink interface, alternatively referred to as PC5, to enable V2X communications, including V2V (vehicle-to-vehicle) communications, V2I (vehicle-to-infrastructure) communications, V2P (vehicle-to-pedestrian) communications and V2N (vehicle-to-network) communications. The PC5 interface is built based on a mesh architecture of peer-to-peer device communication. LTE V2X also supports Uu interface (the radio interface between the mobile device and the radio access network) enhancement to assist the PC5 communications.

NR V2X is being designed to support enhanced V2X use cases such as vehicle platooning that enables the vehicles traveling together to dynamically form a platoon. In general, in vehicle platooning, a leading vehicle manages the platoon, and the other vehicles in the platoon obtain information from the leading vehicle.

NR V2X is also being designed to support extended sensors that enable the exchange of raw or processed data gathered through local sensors or live video images among vehicles, road side units, devices of pedestrian and V2X application servers. NR V2X is also being designed to support advanced driving that enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intension with vehicles in proximity too.

Existing (e.g., PC5-based) interfaces assume a mesh architecture in which every node is a peer to each other. This approach does not rely on any network infrastructure. However, spectrum efficiency cannot be very high because of the peer-to-peer structure. Another drawback of this mesh architecture is that it is not compatible with infrastructure-based cellular networks that utilize a hierarchical architecture. As a result, a separate spectrum needs to be obtained to deploy a V2X service based on a peer-to-peer mesh network architecture, which is very costly.

A wireless communication system, such as, for example, a three party communication framework for V2X can be implemented, in which the three party communication framework imposes a hierarchical structure in the peer-to-peer network. In the three party communication framework, a given node—typically a node other than the transmitter and the receiver—is designated to coordinate the radio resource usage. This chosen node, (which can be chosen by the network or elected by other, managed nodes) can be referred to as a "local manager" or a "scheduler node" (Node-S), and is responsible for the scheduling and resource allocation among the nodes it manages, e.g., a transmitting node (Node-T), and one or more receiving node(s) (Node-R(s)). Such a three-party communication framework is beneficial in advanced use cases such as vehicle platooning, whereas a designated leader node is responsible for leading and managing the platoon.

The three-party communication might not however be sufficient to enable highly reliable communication between nodes that form a V2X connection, due for example to blockage, especially in mm Wave frequencies, or due to an edge effect, where the transmitting node is too far from a node-S or a Node-R to reliably transmit the data.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
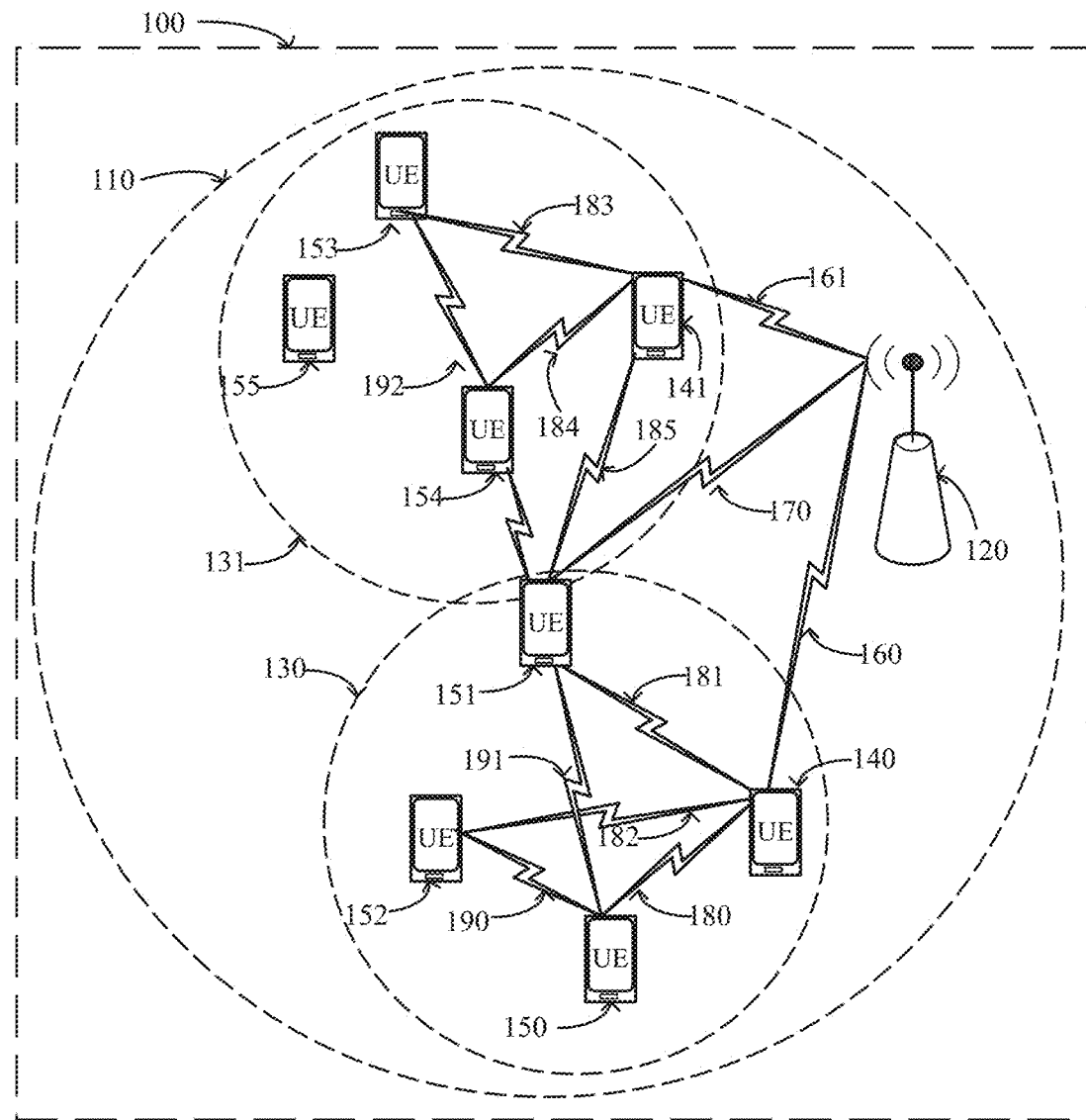
FIG. 1 illustrates an example wireless three-party communication system including scheduling nodes, transmitting nodes and receiving nodes that can communicate via sidelink transmissions, in accordance with various aspects and embodiments of the subject disclosure.

Various aspects of the technology described herein are directed towards increasing the reliability of transmitting information, as well as extending the coverage of a V2X network in one or more implementations. To this end, the technology described herein facilitates relaying the information across multiple nodes, forming a macro-diversity transmitting scheme. One or more aspects of the technology described herein comprise a framework for extending the coverage and reliability of V2X broadcast signals, by having the nodes in the network propagate received information in a multiple-stage (two or more stage) chain communication.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

As exemplified in FIG. 1, a wireless cellular communications system 100 is depicted. A base station 120 provides coverage in geographic area 110 comprising the cell. Air interfaces 160, 161, 170 provide downlink and uplink communication links for UEs 140, 141, 150, respectively. Note that all UEs 140, 141, 150, 151, 152, 153, 154, 155 can be assumed to have uplink/downlink communication links with base station 120, although this is not expressly depicted in FIG. 1 for purposes of readability.

Air interfaces 180, 181, 182, 183, 184, 185, 190, 191, 192 can provide sidelink connectivity between two given UEs. A local manager, referred to herein as Node-S, locally controls transmissions on the sidelink within an area (or other grouping) associated with the Node-S. In the example of FIG. 1, a Node-S 140 controls sidelink transmissions in area 101, and a Node-S 141 controls sidelink transmissions in area 131. In general, a Node-S, such as the Node-S 140, sends common downlink control information (DCI) to a transmitting node (Node-T, such as the node 150) and the receiving node(s), i.e., one or more Node-R(s), such as the node 152. Transmission and reception thus occurs on the sidelink between a plurality of UEs.

Described herein is a mechanism that lets the Node-T acknowledge reception of the downlink control information; (note that in contemporary cellular communications systems, downlink control information is not acknowledged). Also, in contrast to contemporary cellular communications systems, the downlink control information and associated data are transmitted from two different nodes. More particularly, the downlink control information is transmitted by the Node-S 140, whereas data is transmitted by the Node-T 150. Unicast, multicast and broadcast schemes are implemented. Implicit and explicit acknowledgement of the downlink control information by a Node-T are described herein.

In one embodiment, a common downlink control information is sent to the transmitting (Node-T) and receiving (Node-R) nodes. For example, the Node-S 140 may send downlink control information to the nodes 150, 151, 152 via the sidelinks 180, 181, 182, whereby Node-T 150 subsequently sends data to nodes 151 and 152 via the sidelinks 190, 191. The nodes 151 and 152 in this example are each referred to as a Node-R, because the Node-T 150 in this example transmits to a plurality of Node-Rs; this scenario is called the broadcast or multicast scenario. In another example, the Node-S 141 may send downlink control information to the nodes 153, 154 via sidelinks 183,184 whereby the Node-T 153 subsequently sends data to the Node-R 154 via sidelink 192, e.g., in a unicast transmission.

Note that in this example, the local manager nodes 140, 141, namely the Node-S 140 and the Node-s 141 in the system 100 are configured to be local managers by the base station 120 via links 160, 161, whereby any node can transmit or receive via a sidelink controlled by at least one Node-S. Hence, whether a node is transmitting (in the Node-T state) or receiving (in the Node-R state) is dynamically controlled by a Node-S, based on the downlink control information. Note that it is feasible for a Node-S to be elected as a local (group) manager by a group of user equipment nodes without a base station configuration, at least temporarily.

Figure 2:
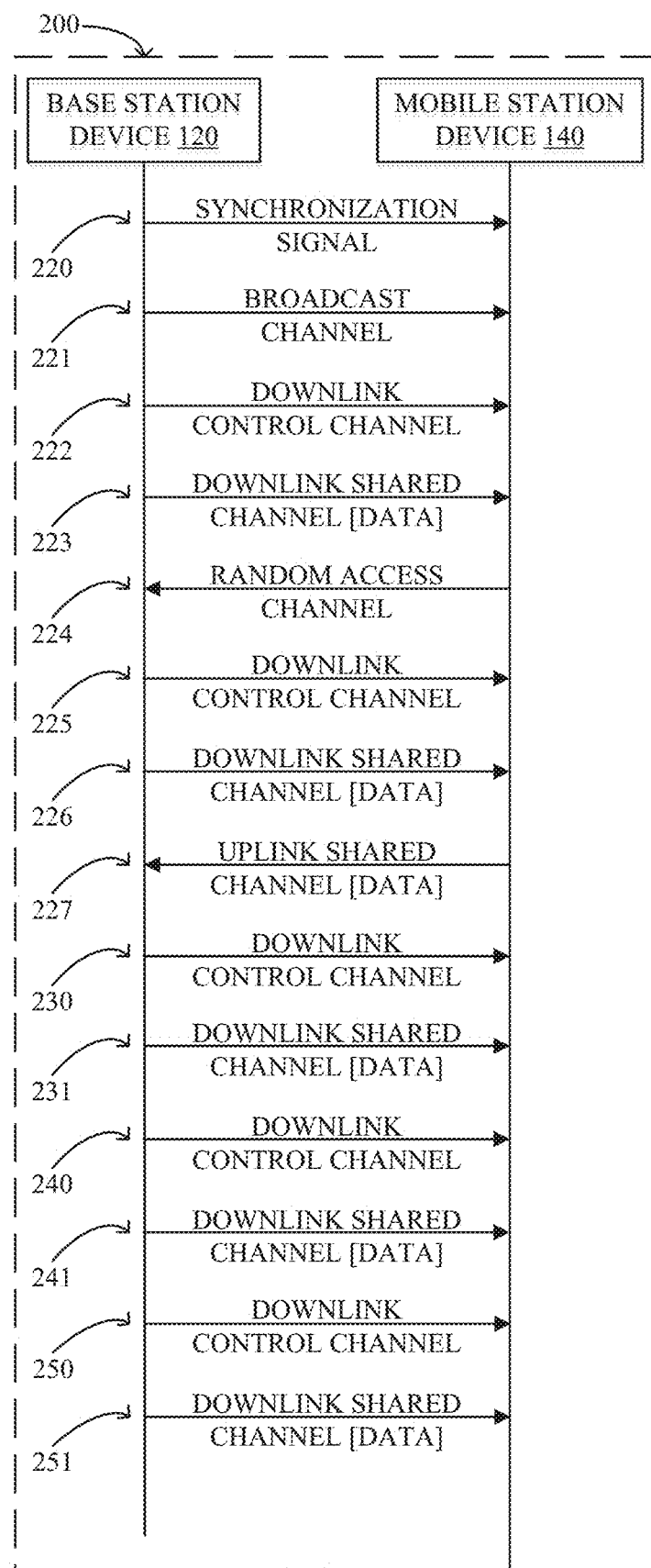
FIG. 2 illustrates an example timing diagram showing communications between a base station and a mobile station device, such as a local manager device, in accordance with various aspects and embodiments of the subject disclosure.

Now referring to FIG. 2, a UE 140 may receive a synchronization signal 220 from a base station 120. The synchronization signal allows the UE 140 to become time and frequency synchronized with base station 120 such that UE 140 can receive waveforms carrying information from base station 120. The synchronization signal may also convey information needed to receive the broadcast channel in 221. Amongst other data, information carried on the broadcast channel configures the UE to receive a downlink control channel 222 for scheduling a downlink shared channel 223. Data transmitted via the downlink shared channel configures the UE to initiate a random access procedure by transmitting a random access channel in 224. The base station schedules a random access response by means of a downlink control channel 225 carried on another downlink shared channel 226. The random access response contains a scheduling assignment and a timing advance for the UE to transmit the first uplink shared channel transmission in 227. The uplink shared channel conveys a user ID. In case of contention resolution during the random access procedure, base station 120 schedules another downlink control channel 230 scheduling a downlink shared channel 231 to resolve contention. Yet another downlink control channel 240 schedules a downlink shared channel 241 to initiate configuration of UE 140 for communication with base station 120. Once UE 140 is fully configured for bi-directional and secure communication with base station 120 via air interface 160, base station 120 sends yet another downlink control channel 250 scheduling a downlink shared channel 251 to initiate configuration of UE 140 as a Node-S.

In one or more implementations, the base station 120 configures each Node-S 140, 141 with orthogonal resource pools. Resources are defined in the time and frequency domain. For example, in a wireless communications system employing orthogonal frequency-division multiple access (OFDMA) different Node-S may be assigned different subcarrier indices (frequency domain) and OFDM symbols (time domain) for data transmission. Similarly, the same or different subcarrier indices and OFDM symbols may be configured for control channel transmissions. For control channel transmissions, however, identical time/frequency resources can be configured for multiple Node-Ss, whereby each Node-S is assigned a different search space for control channel transmissions within the identical time/frequency resources. Additional resources may be configured by base station 120 for each Node-S 140, 141, e.g., for physical random access channel (PRACH) and physical uplink control channel (PUCCH) transmissions. These may be used by a Node-S to send scheduling requests or other uplink control information (UCI) such as channel state information (CSI) feedback or HARQ acknowledgements.

Similarly, the base station 120 configures UEs 150, 151, 152, 153, 154, 155 for communication via sidelinks. Unlike Node-S UEs, which are configured by base station 120 as a Node-S via dedicated signaling (e.g. to configure the orthogonal resource pools and search spaces), UEs that transmit and receive via a sidelink but are not configured as a local manager/Node-S—that is, these nodes are controlled by a Node-S rather than being configured as one—can be configured for sidelink communication under the control of a local manager via common signaling. In particular, a given node that is not a Node-S is aware of the resource pools of the Node-S within cell 110. In one embodiment, these nodes are configured by common broadcast signaling from the base station 120, however, configuration by dedicated messages is not precluded. For example, sidelink information including the resource pools of all Node-S in 110 can be included as part of the radio resource control (RRC) setup or reconfiguration of a node 150, 151, 152, 153, 154, 155. Because a given node that is not a Node-S is aware of the resource pools of the one or more Node-S in 110, such a node can receive downlink control information from one or more Node-S in its proximity. This is illustrated in FIG. 1 for UE 151, which can receive from a first Node-S 140 via a first sidelink 181 and from a second Node-S 141 via a second sidelink 185, respectively.

As mentioned herein, the nodes 150, 151, 152, 153, 154, 155 are configured to receive from the Node-S 140, 141 by base station 120. Hence, when monitoring for downlink control information, a given node 150, 151, 152, 153, 154, 155 potentially can receive downlink control information from multiple Node-Ss. This allows for a seamless transition between a local area 130 controlled by a first local manager Node-S 140 and a local area 131 controlled by a second local manager Node-S 141. In particular, such a transition does not require a handover or any other signaling from base station 120.

Data transmission is facilitated via the sidelinks in a wireless communications system 100, whereby the communication via the sidelink is controlled by local traffic managers Node-S 140, 141. Note that in traditional state-of-the-art communications systems, control channel and data channel transmissions are transmitted and received by the same pair of nodes. For example, in FIG. 2, both downlink shared channel and uplink shared channel transmissions are scheduled by base station 120, whereby for the downlink base station 120 is the transmitter and UE 140 is the receiver, and whereby for the uplink, UE 140 is the transmitter and base station 120 is the receiver. Even for the state-of-the-art sidelink, e.g., in the device-to-device (D2D) feature of the Long-Term Evolution (LTE) standard defined by the Third Generation Partnership Project (3GPPP), the control and data transmissions occur between two UEs. In the embodiments described herein, and unlike prior art that exclusively deals with pairs of nodes, a three-party communication sidelink design can be provided. The HARQ and scheduling procedures of a three-party communication sidelink design are described herein; however it should be understood that the technology described herein is not limited to a three-party communication system as used in the examples, but can provide benefits with and is intended to work in any wireless communication system.

Unlike traditional D2D or vehicle-to-vehicle (V2V) communications systems, which deal with pairs of nodes, in which for a given node the sidelink control channel and the sidelink data channel transmissions occur between the same pair of nodes, in one or more embodiments described herein, downlink control information is transmitted by a Node-S and data is transmitted by a Node-T and received by a Node-R. Generally, Node-S, Node-T, and Node-R are three distinct nodes, however, a scenario in which a Node-S also acts as a transmitter Node-T are not precluded. Furthermore, as discussed herein, whether a node acts as transmitter (Node-T) or receiver (node-R) is generally controlled by the Node-S, depending on whether the downlink control information sent by Node-S and received by a given node instructs the receiving node to transmit (in which case it acts as Node-T) or to receive (in which case it acts as Node-R).

Figure 3:
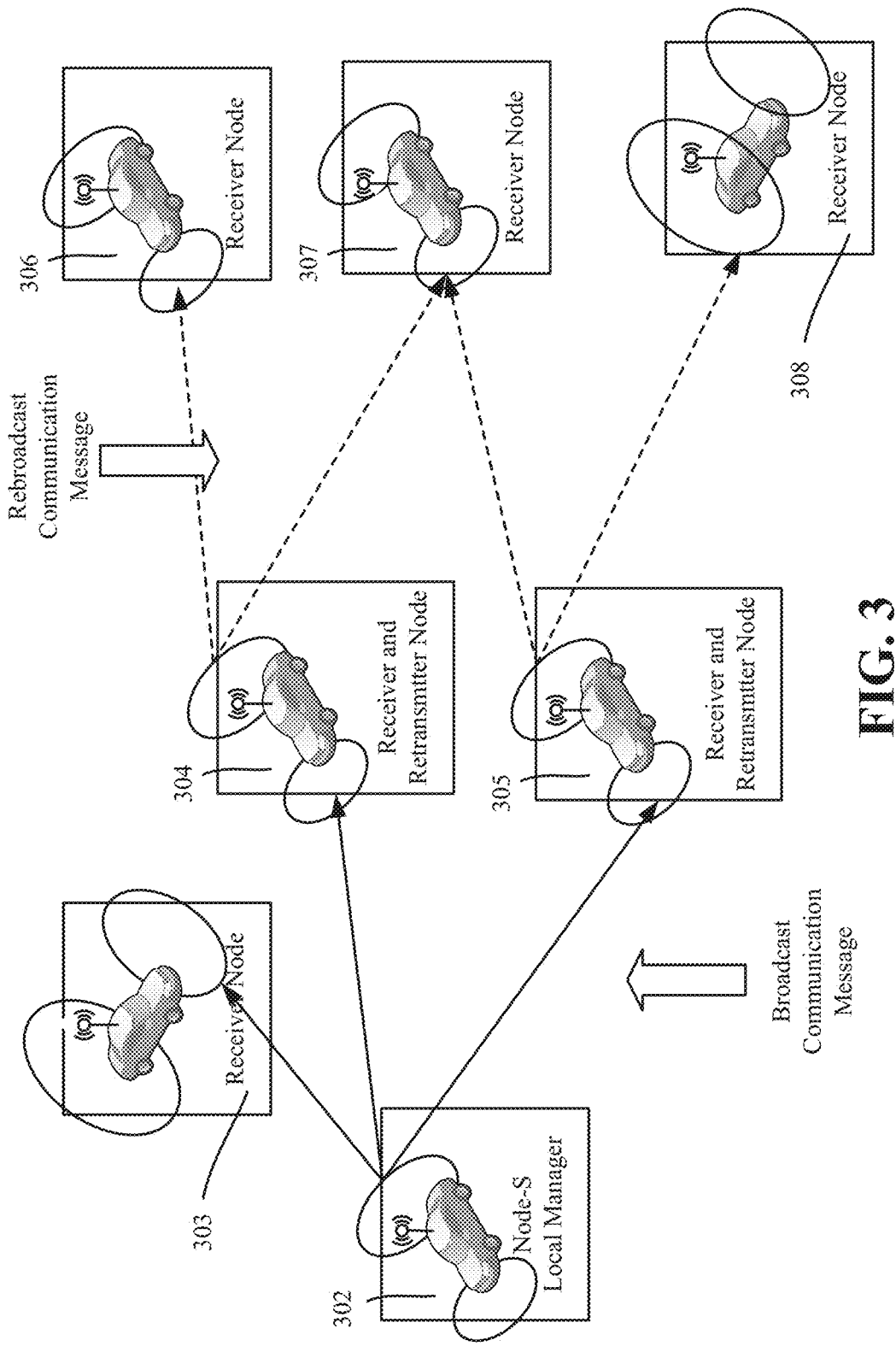
FIG. 3 is an example representation of how a communication can be rebroadcast to propagate information in a multiple-stage chain communication, in accordance with various aspects and embodiments of the subject disclosure.

FIG. 3 shows an example of how a broadcast communication message from one node is propagated by rebroadcasting the communication message to other nodes, such as other nodes of a three party communication system. Note that the communication message can comprise any information, such as control channel data, or data channel data.

In the example of FIG. 3, consider that the node 302 is a local manager (Node-S), which manages a group of nodes (which can possibly be a platoon lead by the local manager). In the example of FIG. 3, the node 302 broadcasts a communication message that is received by the nodes 303-305. In this example, the nodes 306-308 do not receive (or cannot decode) the broadcast communication message, such as because of blockage or due to an edge effect.

As described herein, the receiver (and retransmitter) nodes 304 and 305 that do receive the broadcast communication message recognize that the message is intended to be rebroadcast. Thus, the receiver and retransmitter nodes 304 and 305 rebroadcast the communication message to the receiver nodes 306-308. In this example, the receiver nodes 306-308 do not further rebroadcast the communication message, although as described herein the technology is not limited to a single rebroadcast instance.

It should be noted that a node only rebroadcasts the received information if the node is able to successfully decode the received information. Thus, for example, consider that the receiver node 303 directly receives the initial communication message from the node 302, but cannot successfully decode the received communication message. Thus, the receiver node 303 is not able to rebroadcast the communication message. Note that the receiver node 303 possibly can receive the rebroadcast communication message, although this is not shown in FIG. 1, e.g., because the receiver node is experiencing blockage with respect to the rebroadcast communication message, the antenna panels of the receiver nodes 304 and 305 are not appropriate for transmitting to the receiver node 303, and so on. It is also feasible for a node to receive a broadcast communication that is intended to be rebroadcast but does not perform the rebroadcasting operation; e.g., the node leaves the group (e.g., platoon) before it is scheduled to rebroadcast, the node is in an idle/inactive state to conserve power, the node is turned off before it can rebroadcast the information, and so on.

Figure 4:
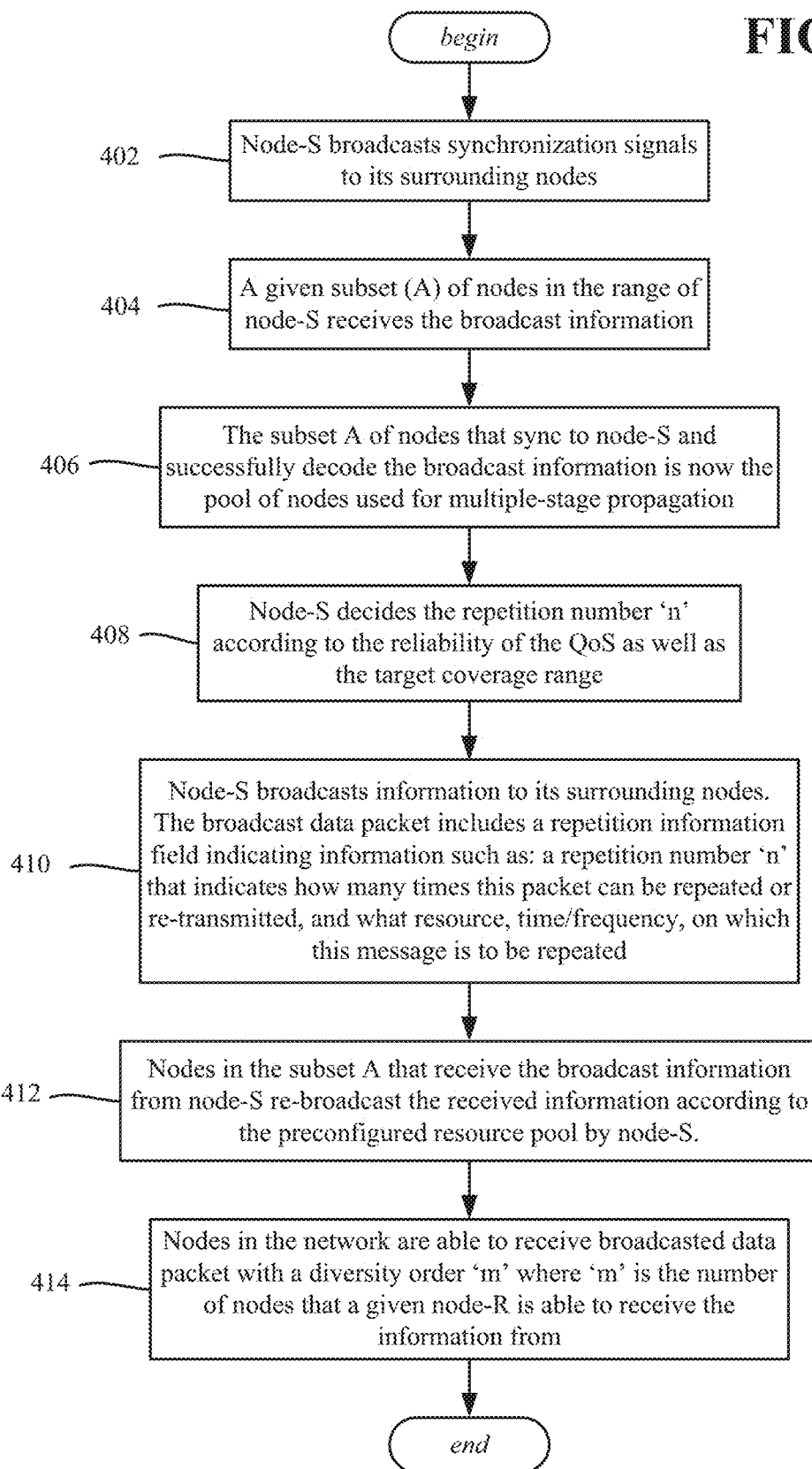
FIG. 4 is flow diagram representing example operations related to propagating information in a multiple-stage chain communication, in accordance with various aspects and embodiments of the subject disclosure.

FIG. 4 describes example operations in one procedure in the presence of a local manager (LM) node-S, beginning at operation 402. At operation 402, a Node-S broadcasts information (e.g., synchronization signals) to its surrounding nodes. The broadcasted information can include information on preconfigured resource pool (time/frequency, etc.), MCS (modulation coding scheme), and so on for other nodes to retransmit if needed Operation 404 represents a given subset (A) of nodes in the range of node-S receiving the broadcast information. At operation 406 the subset A of nodes that sync to node-S and successfully decode the broadcast information now makes up the pool of nodes used for multiple-stage propagation.

Operation 408 represents Node-S determining a repetition number 'n' according to the desired reliability of the QoS as well as the target coverage range. For example, in one implementation described herein, a repetition number of two (2) means rebroadcast twice in the chain, a repetition number of one (1) means rebroadcast once in the chain, a repetition number of zero (0) means to not rebroadcast. The larger the "n" value, the higher the diversity order (the greater the chance that a node will receive the rebroadcast message from at least one source), and the higher the reliability. The larger the "n" value, the higher the coverage increase of the given V2X network.

At operation 410, the Node-S broadcasts information to its surrounding nodes. The broadcast data packet includes a repetition information field indicating information, such as, the repetition number 'n' that indicates how many times this packet can be repeated or retransmitted, and on what resources, time/frequency, on which this message is to be repeated.

As represented by operation 412, nodes in the subset A that receive the broadcast information from the node-S rebroadcast the received information (as long as the repetition number is not zero) according to the preconfigured resource pool by node-S. A node only rebroadcasts the received information if the node was able to successfully decode the received information. After successfully decoding the data packet, nodes follow the repetition field and rebroadcast the same data packet if the repetition number 'n' in the repetition field is greater than zero.

When a node in the pool A rebroadcasts the information, the repetition number in the repetition field is modified (reduced by one in this example implementation) in comparison with the received data packet. For example, if the repetition number is 3, the node reduces the repetition number to 2 and then rebroadcasts the information.

As can be readily understood, eventually (if not initially at zero) a rebroadcast packet will have a repetition number reduced to zero. If the received data packet has a repetition number of zero in the repetition field, the receiving node or nodes do not retransmit this data packet.

For a node with more than one antenna panel, the antenna panel on which a given node transmits can be chosen (block 502 of FIG. 5) according to a previously established connection, for example the antenna panel chosen (block 504) during initial access according to the panel that was used to receive originally broadcasted information, in the presence of beam correspondence. Alternatively, the antenna panel on which a given node transmits can be chosen (block 506) according to the size and type of the V2X network, e.g., based on a predictive machine learning approach. Another alternative (block 508) is for a node to choose the antenna panel randomly, given a limited number of beams/panels in the vehicular network.

Figure 5:
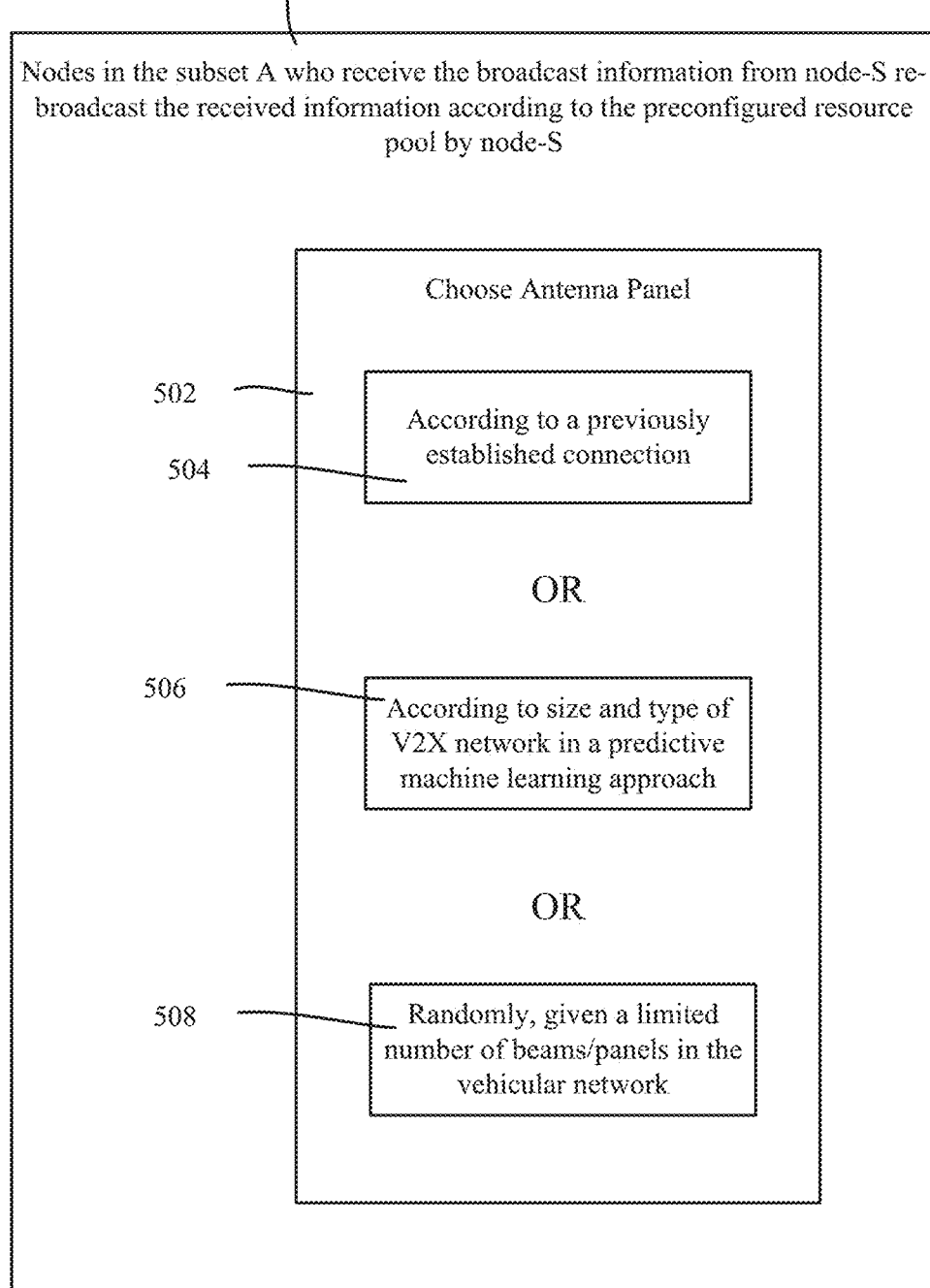
FIG. 5 represents example operations with respect to selecting an antenna panel for rebroadcasting received information, in accordance with various aspects and embodiments of the subject disclosure.

Because nodes in A that successfully decode the data packet and repeat this data packet at the designated frequency and time resource by node-S, macro diversity can be achieved when a receiving node receives the data packet from multiple transmitters. As represented by operation/block 414, nodes in the network are able to receive broadcasted data packet with a diversity order represented by an 'm' value, where 'm' is the number of nodes from which a given node-R is able to receive the information. The larger the "m" value, the higher the diversity order, and the higher the reliability. The larger the "m" value, the higher the coverage increase of the given V2X network As described above with reference to operation 412 of FIG. 4, FIG. 5 shows options for selecting an antenna panel for a retransmission; (assuming a node has more than one antenna panel from which to choose. In FIG. 5, non-limiting example options include an option (502) for choosing according to a previously established connection, for example during initial access according to the panel that was used to receive originally broadcasted information, in the presence of beam correspondence. Another example option is to choose (306.e.ii) according to size and type information with respect to the V2X network in a predictive machine learning approach. Yet another example option is to choose (306.e.iii) randomly, given a limited number of beams/panels in the vehicular network As described above with reference to operation 306.f, the increased diversity in the network can be thought of as "macro diversity" as copies of the same information are received at a given node-R from multiple sources. For example, in FIG. 2, the node 207 receives the rebroadcast communication message from the node 204 and the node 205 (m=2 for the node 207).

Figure 6:
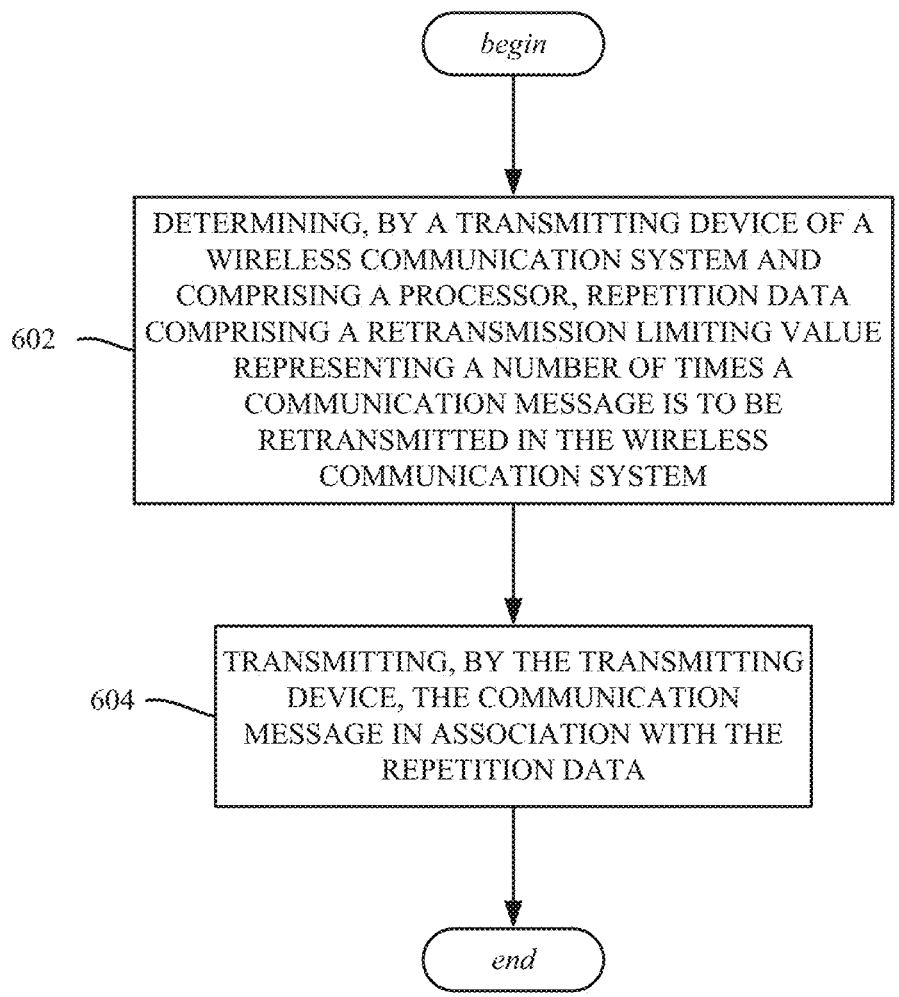
FIG. 6 illustrates example operations of a transmitting device with respect to setting up and transmitting a communication message that is intended for retransmission, in accordance with various aspects and embodiments of the subject disclosure.

One or more aspects, such as those implemented in example operations of a method, are shown in FIG. 6 in accordance with various aspects and embodiments of the subject disclosure. Operation 602 represents determining, by a transmitting device of wireless communication system and comprising a processor, repetition data comprising a retransmission limiting value representing a number of times a communication message is to be retransmitted in the wireless communication system. Operation 602 represents transmitting, by the transmitting device, the communication message in association with the repetition data.

The transmitting device can comprise a local manager, and transmitting the communication message in association with the repetition data comprises broadcasting the communication message. The transmitting device can comprise a local manager, and transmitting the communication message can comprise transmitting the communication message in further association with resource information comprising resources to be used in a retransmission of the communication message.

The transmitting device can comprise a local manager, and transmitting the communication message can comprise transmitting the communication message in further association with timing information and frequency information to be used in a retransmission of the communication message.

Aspects can comprise, selecting, by the transmitting device, an antenna panel for transmitting the communication message. Selecting the antenna panel for transmitting the communication message can comprise choosing the antenna panel based on a previously established connection. Selecting the antenna panel for transmitting the communication message can comprise choosing the antenna panel based on vehicle-to-everything network size and type information. Selecting the antenna panel for transmitting the communication message can comprise choosing the antenna panel randomly or pseudo-randomly when there is a known number of beams and/or panels in the vehicular network.

Figure 7:
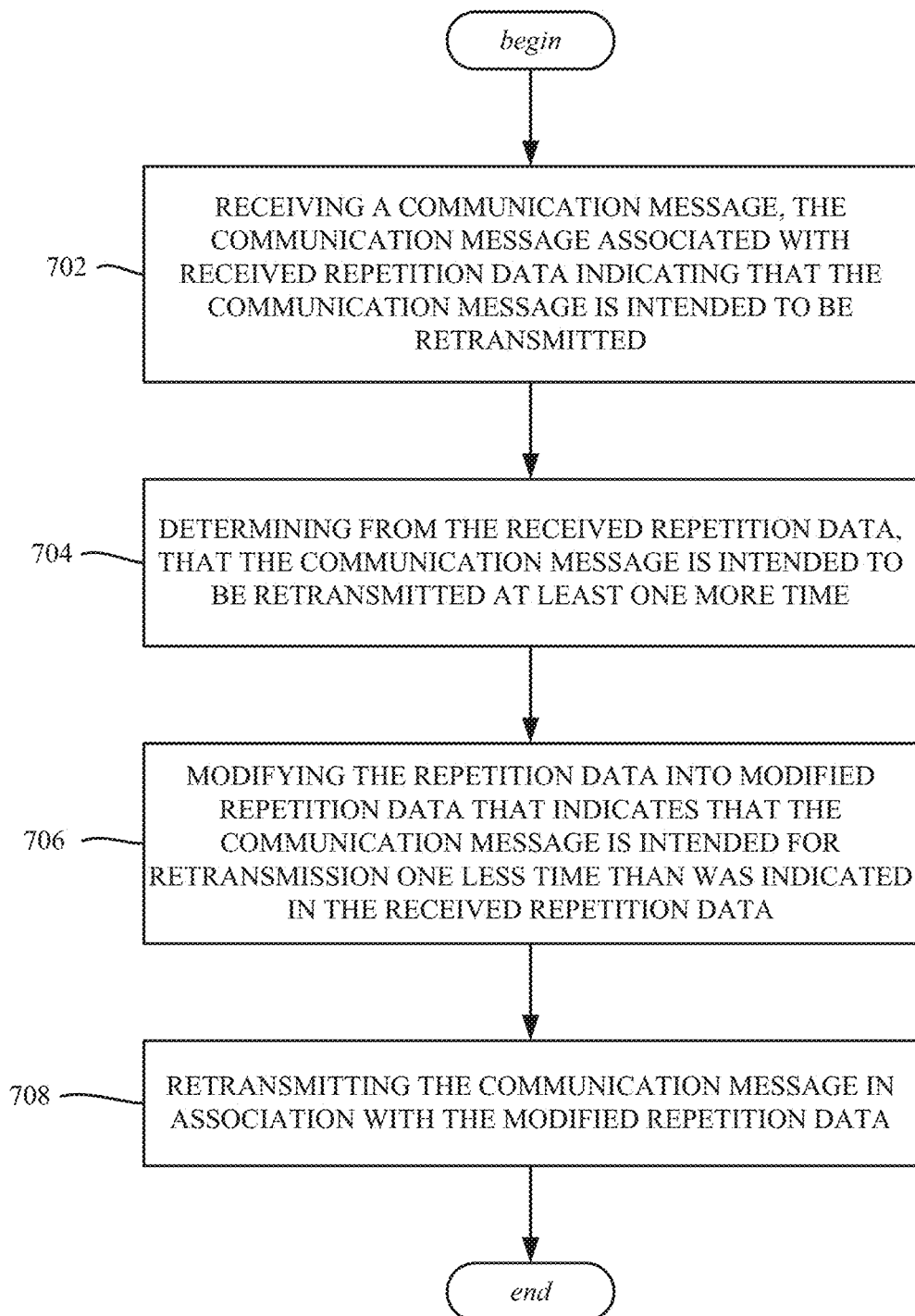
FIG. 7 illustrates example operations of a receiver device with respect to receiving and retransmitting a communication message, in accordance with various aspects and embodiments of the subject disclosure.

One or more example aspects are represented in FIG. 7, and can correspond to a receiver device (e.g., of a wireless communications system, which can be a three-party communications system) comprising a processor and a memory that stores executable instructions that, when executed by the processor, facilitate performance of operations and/or components. Example operations comprise operation 702, which represents receiving a communication message, the communication message associated with received repetition data indicating that the communication message is intended to be retransmitted. Operation 704 represents determining from the received repetition data, that the communication message is intended to be retransmitted at least one more time. Operation 706 represents modifying the repetition data into modified repetition data that indicates that the communication message is intended for retransmission one less time than was indicated in the received repetition data. Operation 708 represents retransmitting the communication message in association with the modified repetition data.

Modifying the repetition data into the modified repetition data can indicate that the communication message is no longer intended for further retransmission before retransmitting the communication message in association with the modified repetition data.

Retransmitting the communication message can comprise broadcasting the communication message.

Further operations can comprise receiving resource data associated with the communication message, the resource data specifying resources to be used by the receiver device in a retransmission of the communication message; retransmitting the communication message in association with the modified repetition data can comprise using the resource data.

Further operations can comprise selecting an antenna panel for the retransmitting of the communication message.

Selecting the antenna panel for retransmitting the communication message can comprise choosing the antenna panel based on a previously established connection. Selecting the antenna panel for retransmitting the communication message can comprise choosing the antenna panel based on vehicle-to-everything network size and type information. Selecting the antenna panel for retransmitting the communication message can comprise choosing the antenna panel randomly or pseudo-randomly when there is a known number of beams and/or panels in the vehicular network.

Figure 8:
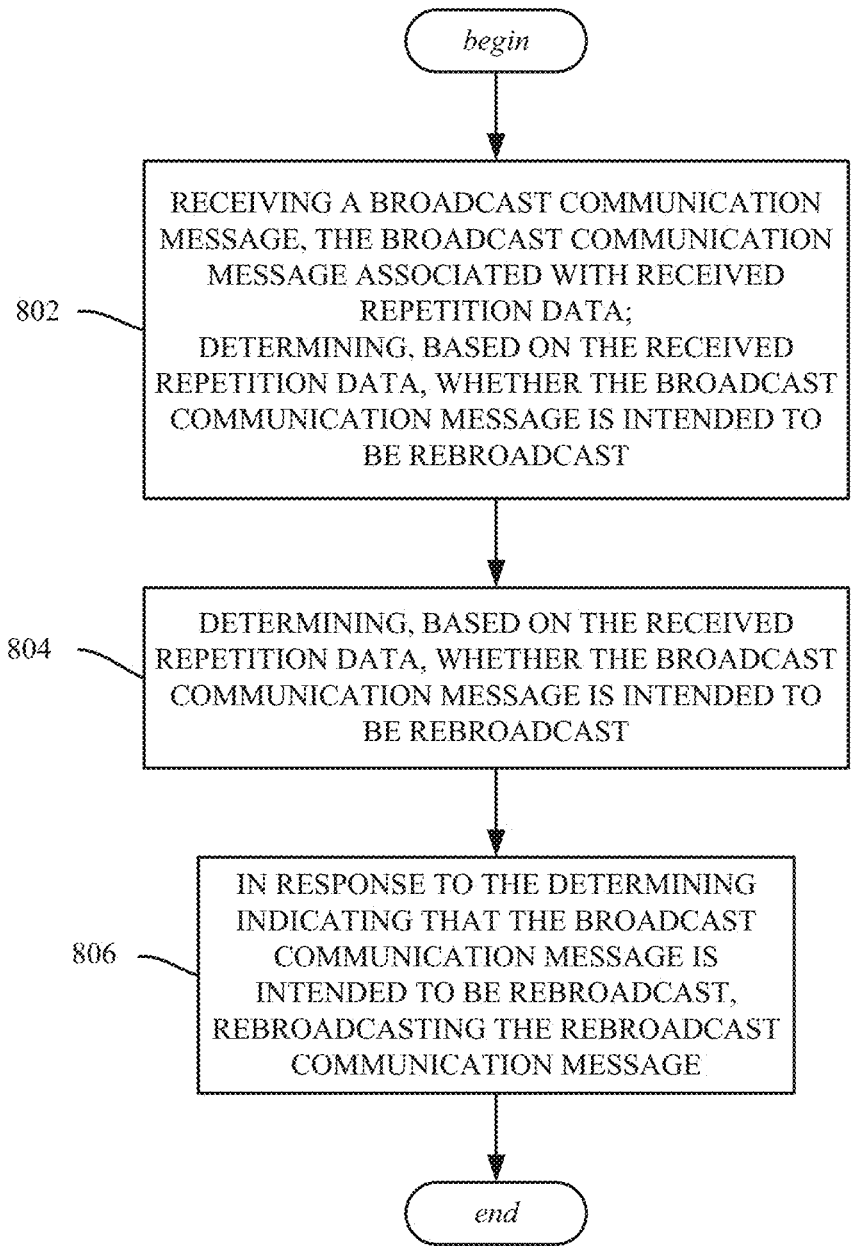
FIG. 8 illustrates example operations of a receiver device with respect to handling a communication message that is intended for rebroadcasting, in accordance with various aspects and embodiments of the subject disclosure.

One or more aspects, such as implemented in a machine-readable storage medium, comprising executable instructions that, when executed by a processor of a network device of a wireless communication system, facilitate performance of operations, are represented in FIG. 8. Example operations comprise operation 802, which represents receiving a broadcast communication message, the broadcast communication message associated with received repetition data. Operation 804 represents determining, based on the received repetition data, whether the broadcast communication message is intended to be rebroadcast. Operation 806 represents, in response to the determining indicating that the broadcast communication message is intended to be rebroadcast, rebroadcasting the rebroadcast communication message.

Further operations can comprise modifying the received repetition data into modified repetition data that indicates that the communication message is intended for rebroadcasting one less time than was indicated in the received repetition data.

Further operations can comprise receiving resource data associated with the broadcast communication message, the resource data specifying resources to be used by the receiver device in rebroadcasting the broadcast communication message; rebroadcasting the broadcast communication message can comprise using the resource data.

Further operations can comprise selecting an antenna panel for the rebroadcasting the rebroadcast communication message.

As can be seen, described is a multiple-stage broadcast procedure in a V2X network that increases coverage and reliability of a given V2X network. The technology described herein facilitates increased reliability and coverage in a V2X network. The technology provides for a multiple-hop (e.g., two-hop) control between a local manager and transmitter node and a transmitter node and a receiver node, such that the reliability of the control channel does not suffer.

Figure 9:
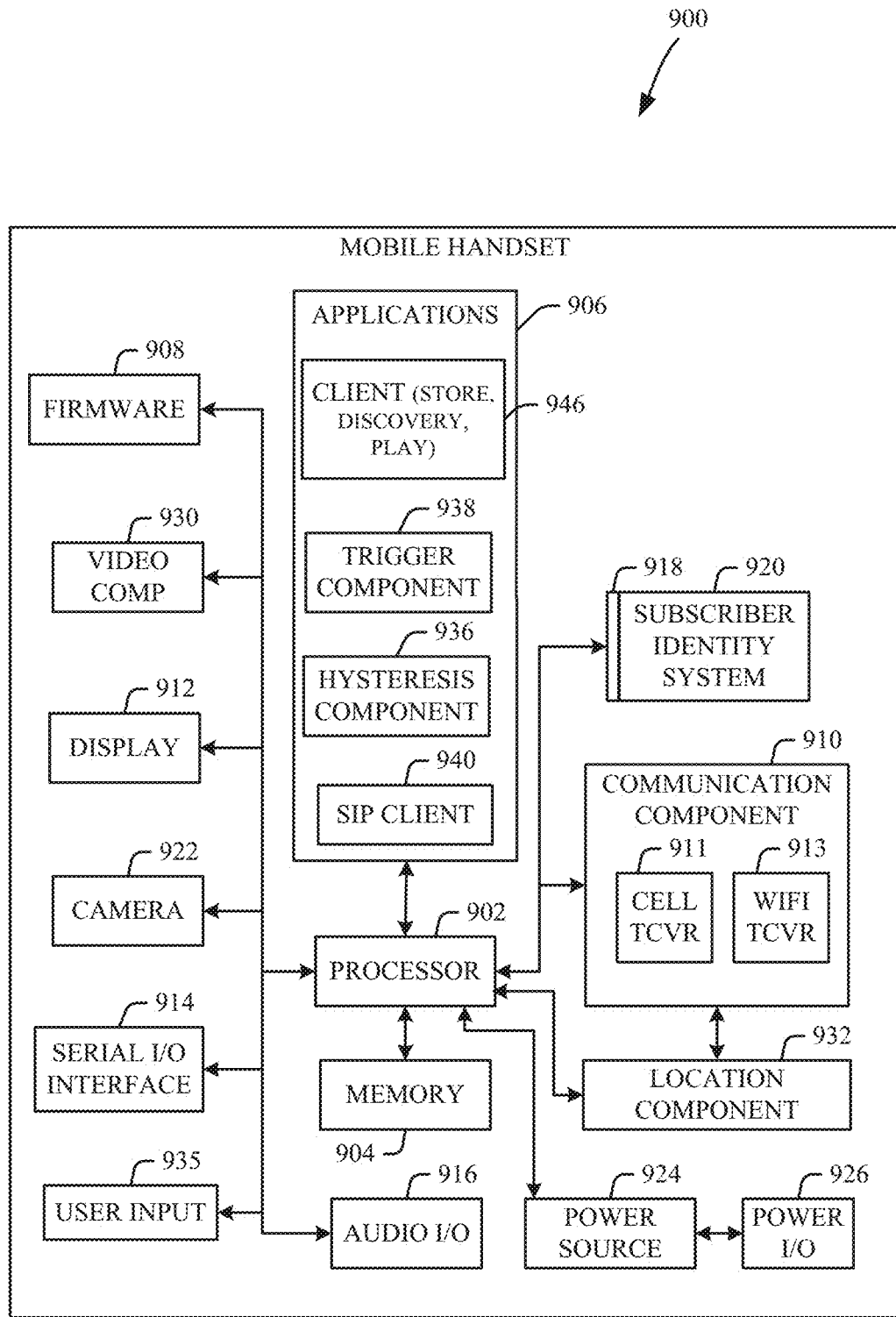
FIG. 9 illustrates an example block diagram of an example user equipment that can be a mobile handset, in accordance with various aspects and embodiments of the subject disclosure.

The multiple-stage broadcast information facilitates a more reliable communication in V2X, in which an increased diversity order increases coverage in a V2X network. The multiple-stage broadcast information mitigates blockage effects by increasing the probability of receiving information at a given node. The reliability increase is a function of the increase in diversity order, and the number of nodes that are used in the second stage of propagation. This technology described herein facilitates nodes to communicate using narrower beams (e.g., mmWave frequencies), without having to sweep multiple beams to increase coverage Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on.

Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
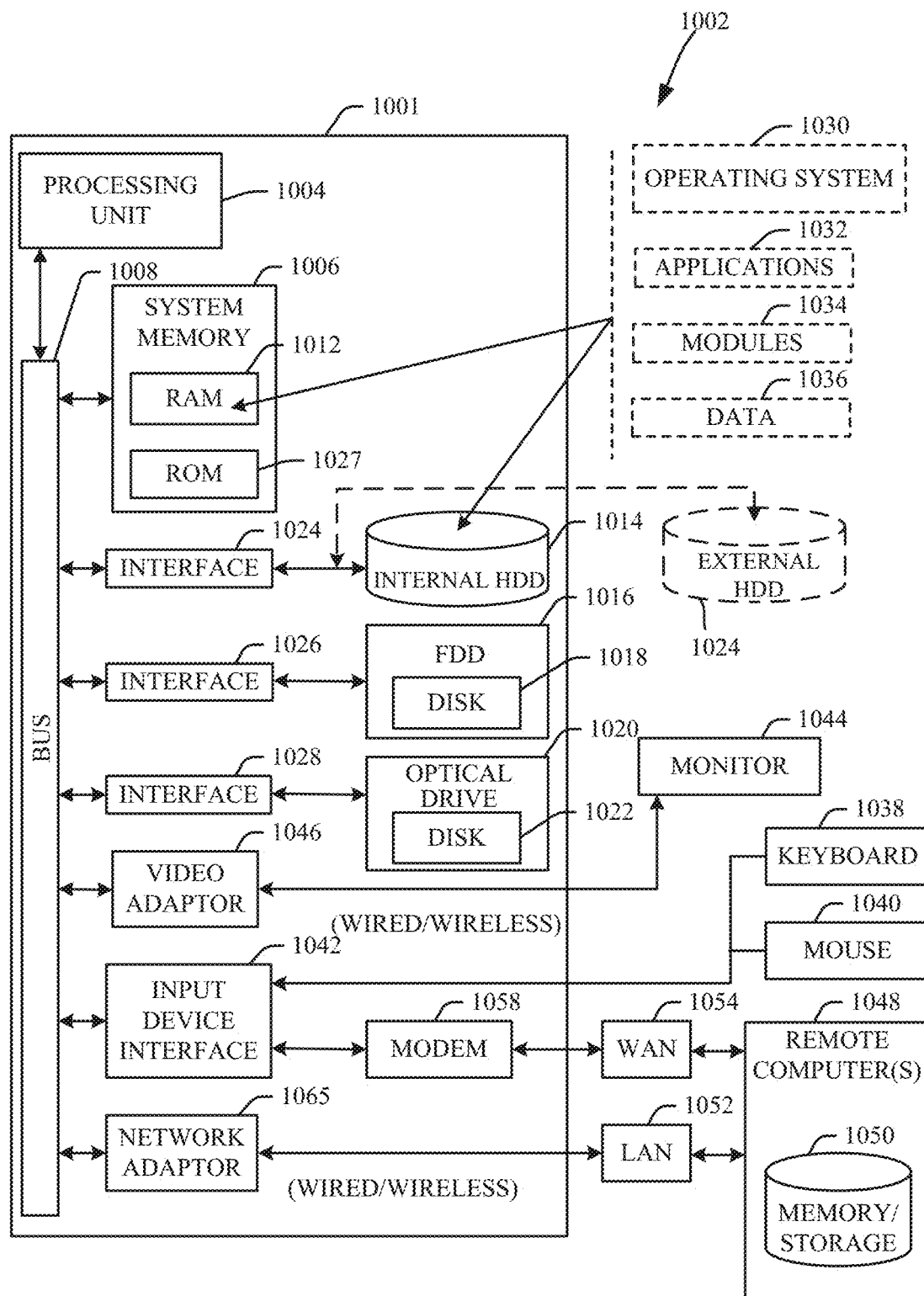
FIG. 10 illustrates an example block diagram of a computer that can be operable to execute processes and methods, in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, GNB 202, etc.) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   determining, by a transmitting device, repetition data comprising a retransmission limiting value representing a number of times that a communication message is to be retransmitted in a network; and
   transmitting, by the transmitting device, the communication message in accordance with the repetition data, wherein the transmitting comprises selecting an antenna panel for the transmitting of the communication message based on a previously established connection prior to the transmitting.

2. The method of claim 1, wherein the transmitting device comprises a local manager, and wherein the transmitting of the communication message comprises transmitting the communication message in further accordance with resource information comprising resources to be used in a retransmission of the communication message.

3. The method of claim 1, wherein the transmitting device comprises a local manager, and wherein the transmitting of the communication message further comprises transmitting the communication message in further accordance with timing information and frequency information to be used in a retransmission of the communication message.

4. The method of claim 1, wherein the selecting of the antenna panel is further based on vehicle-to-everything network size and type information.

5. The method of claim 1, wherein the selecting of the antenna panel for the transmitting of the communication message comprises choosing the antenna panel randomly or pseudo-randomly when there is a known number of panels in a vehicular network.

6. A user equipment, comprising:
a processor; and
a memory that stores executable instructions that, when executed by the processor, facilitate performance of operations, comprising:
determining repetition data comprising a retransmission limiting value representing a number of times that a communication message is to be retransmitted in a network; and
transmitting the communication message based on the repetition data, wherein the transmitting comprises selecting an antenna panel for the transmitting of the communication message based on based on vehicle-to-everything network size and type information.

7. The user equipment of claim 6, wherein the user equipment comprises a local manager, and wherein the transmitting of the communication message comprises transmitting the communication message further based on resource information comprising resources to be used in a retransmission of the communication message.

8. The user equipment of claim 6, wherein the user equipment comprises a local manager, and wherein the transmitting of the communication message further comprises transmitting the communication message further based on timing information and frequency information to be used in a retransmission of the communication message.

9. The user equipment of claim 6, wherein the selecting of the antenna panel is further based on a previously established connection previous to the transmitting.

10. The user equipment of claim 6, wherein the selecting of the antenna panel for the transmitting of the communication message comprises choosing the antenna panel randomly or pseudo-randomly when there is a known number of panels in a vehicular network.

11. A non-transitory machine-readable medium, comprising executable instructions that, when executed by a processor of a local manager user equipment, facilitate performance of operations, comprising:
determining repetition data comprising a retransmission limiting value representing a number of times that a communication message is to be retransmitted via a network; and
transmitting the communication message in accordance with the repetition data, wherein the transmitting comprises selecting an antenna panel for the transmitting of the communication message based on a previously established connection.

12. The non-transitory machine-readable medium of claim 11, wherein the transmitting of the communication message comprises transmitting the communication message in further accordance with resource information comprising resources to be used in a retransmission of the communication message.

13. The non-transitory machine-readable medium of claim 11, wherein the transmitting of the communication message further comprises transmitting the communication message in further accordance with timing information and frequency information to be used in a retransmission of the communication message.

14. The non-transitory machine-readable medium of claim 11, wherein the selecting of the antenna panel is further based on vehicle-to-everything network size and type information.

15. The non-transitory machine-readable medium of claim 11, wherein the selecting of the antenna panel for the transmitting of the communication message comprises, based on a known number of panels in a vehicular network, choosing the antenna panel randomly or pseudo-randomly.

16. The non-transitory machine-readable medium of claim 11, wherein the selecting of the antenna panel comprises employing a machine learning process for the selecting.

17. The method of claim 1, wherein the selecting of the antenna panel comprises employing a machine learning model for the selecting.

18. The user equipment of claim 6, wherein the selecting of the antenna panel comprises employing a predictive machine learning approach for the selecting.

19. The method of claim 1, further comprising modifying, by the transmitting device, the repetition data based on a quality of service parameter.

20. The user equipment of claim 6, wherein the operations further comprise modifying the repetition data based on a target coverage range.

* * * * *